(12) United States Patent
Chan et al.

(10) Patent No.: US 7,787,219 B2
(45) Date of Patent: Aug. 31, 2010

(54) IN A DISK DRIVE APPARATUS HAVING A DIVERTER FOR PROVIDING STREAMLINED CONTOUR AND REDUCED AXIAL FLOW AT THE ACTUATOR ATTACHMENT INTERFACE BETWEEN A FLEXIBLE CABLE AND FLEXURE

(75) Inventors: Andre S. Chan, Milpitas, CA (US); Manoj B. Keshavan, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 820 days.

(21) Appl. No.: 11/695,080

(22) Filed: Apr. 2, 2007

(65) Prior Publication Data

US 2008/0239574 A1    Oct. 2, 2008

(51) Int. Cl.
*G11B 5/55* (2006.01)
(52) U.S. Cl. .................. 360/265.7; 360/264.2; 360/266
(58) Field of Classification Search ... 360/265.7–266.1, 360/264.2
See application file for complete search history.

(56) References Cited

U.S. PATENT DOCUMENTS

| 6,236,531 | B1 * | 5/2001 | Allsup et al. | 360/97.01 |
| 2004/0012893 | A1 * | 1/2004 | Tadepalli | 360/266 |

* cited by examiner

*Primary Examiner*—A.J. Heinz (57) ABSTRACT

An airflow diverter is used to overcome the adverse effect of flow-induced vibration of a disk drive pivot actuator. The diverter may be formed as a separate component or as an integral portion of the flex stiffener or the actuator itself. The invention streamlines the actuator to the incoming airflow and helps reduce the torque disturbance to the actuator as it reduces the sail or parachute effect. This helps reduce power consumption due to a lower drag from the actuator assembly. The contour of the flow deflector is designed to conform closely to the curvature of the disk boundaries when the actuator is rotated to the ID position on the disk. This design serves as a shroud around the disk stack which further helps to reduce power by preserving flow momentum.

20 Claims, 7 Drawing Sheets

IN A DISK DRIVE APPARATUS HAVING A DIVERTER FOR PROVIDING STREAMLINED CONTOUR AND REDUCED AXIAL FLOW AT THE ACTUATOR ATTACHMENT INTERFACE BETWEEN A FLEXIBLE CABLE AND FLEXURE

BACKGROUND OF THE INVENTION

1. Technical Field

The present invention relates in general to disk drives and, in particular, to an improved system and apparatus for providing a streamlined contour and reduction in axial flow at the suspension-to-flexure attachment interface in a disk drive.

2. Description of the Related Art

Data access and storage systems generally comprise one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to five disks are stacked vertically on a common spindle that is turned by a disk drive motor at several thousand revolutions per minute (rpm).

A typical HDD uses an actuator assembly to move magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably-contacting the disk.

A slider is typically formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

Figure 1:
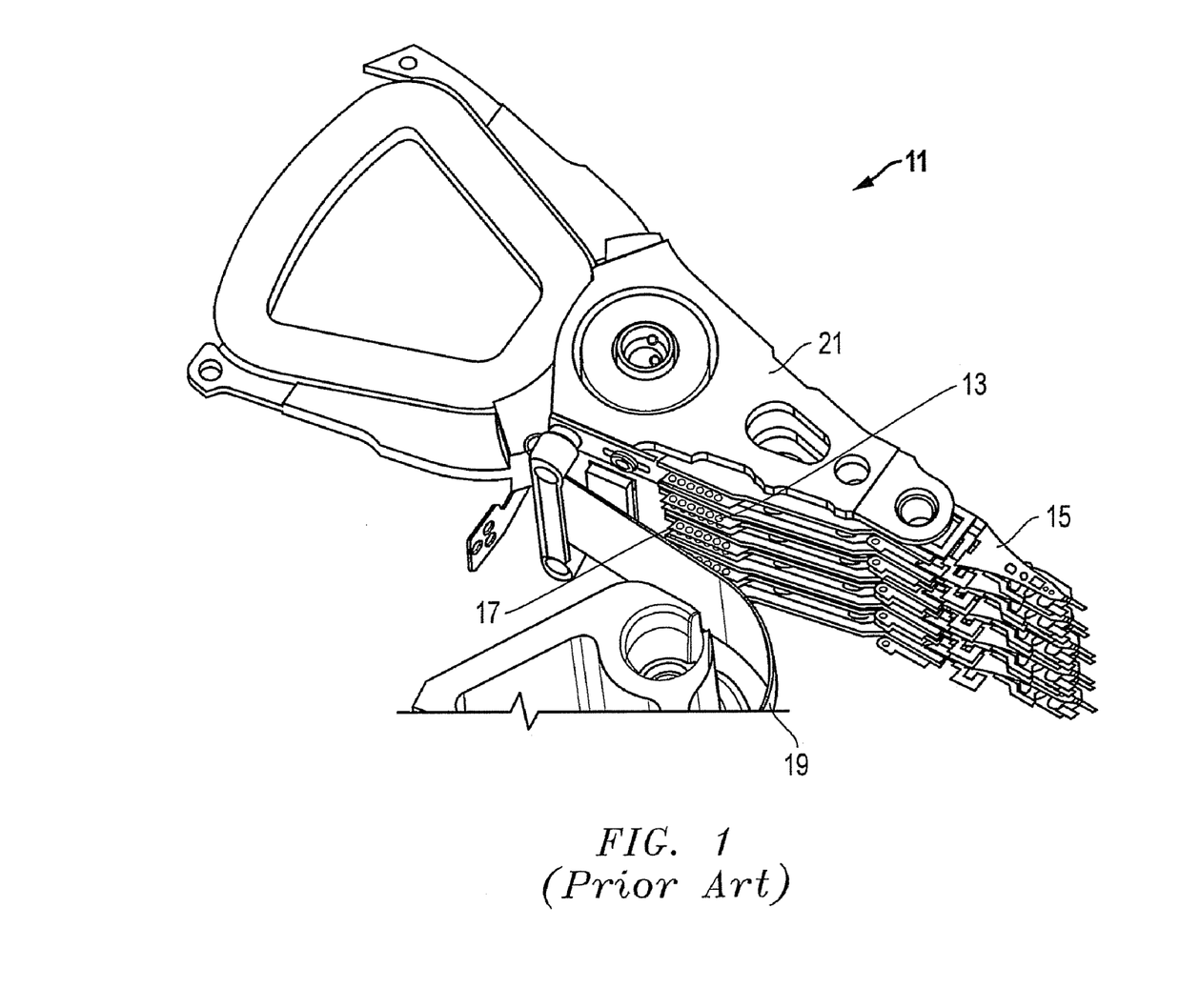
FIG. 1 is an isometric view of a conventional actuator assembly.

In the prior art, airflow-induced vibration of the rotary actuator 11 (see, e.g., FIG. 1) in disk drives adversely affects performance because of track misregistration, or TMR. In a typical design, the conductive traces on the integrated lead suspension (ILS) tail 13 that extend from the head gimbal assembly (HGA) 15 are soldered to the pads 17 on a flexible cable assembly 19. In such an arrangement, the flexible cable assembly pads 19 cumulatively provide a large surface area against which the axial or cross airflow acts at the disk edge boundaries when the actuator 11 rotates toward the inner diameter of the disks. The flexible cable assembly itself is a stiffener that acts not only as a barrier to the circumferential flow resulting in increased torque disturbance, but also exacerbates the axial flow impinging on the ILS tail 13. These forces are transmitted to the actuator arm structure 21 and result in increased vibration of the actuator 11 and manifest as TMR degradation. Thus, a solution that addresses this problem would be desirable.

SUMMARY OF THE INVENTION

Embodiments of a system and apparatus for overcoming the adverse effect of flow-induced vibration of the rotary actuator are disclosed. An airflow deflector or diverter may be formed as a separate component or as an integral portion of the flex stiffener or the actuator itself. The invention streamlines the actuator to the incoming airflow and helps reduce the torque disturbance to the actuator as it reduces the sail or parachute effect. This helps reduce power consumption due to a lower drag from the actuator assembly. The contour of the flow deflector is designed to conform closely to the curvature of the disk boundaries when the actuator is rotated to the ID position on the disk. This design serves as a shroud around the disk stack which further helps to reduce power by preserving flow momentum.

In addition, axial or cross airflow impinging on the ILS tail pads is greatly reduced and thereby reduces ILS tail flutter and any vibration from being transmitted to the arm. In one embodiment, the invention is an integral part of the flex stiffener and also helps increase heat conduction away from the stiffener while improving heat dissipation from forced convection. The invention further reduces the likelihood of damage (e.g., bending) to the flex stiffener during handling since it now abuts against the flow deflector which provides a stable support surface.

In one embodiment, the geometry of the disk and actuator provide a concave shape to the modified streamlined contour of the diverter. The shape may be bounded by the original contour of the actuator and extend as a surface from the tip of the flex attachment or stiffener (e.g., tangentially) to the original contour. Various other embodiments may be adjusted for the overall actuator and disk geometries as well as the required functionality, such as TMR requirements, etc.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 2:
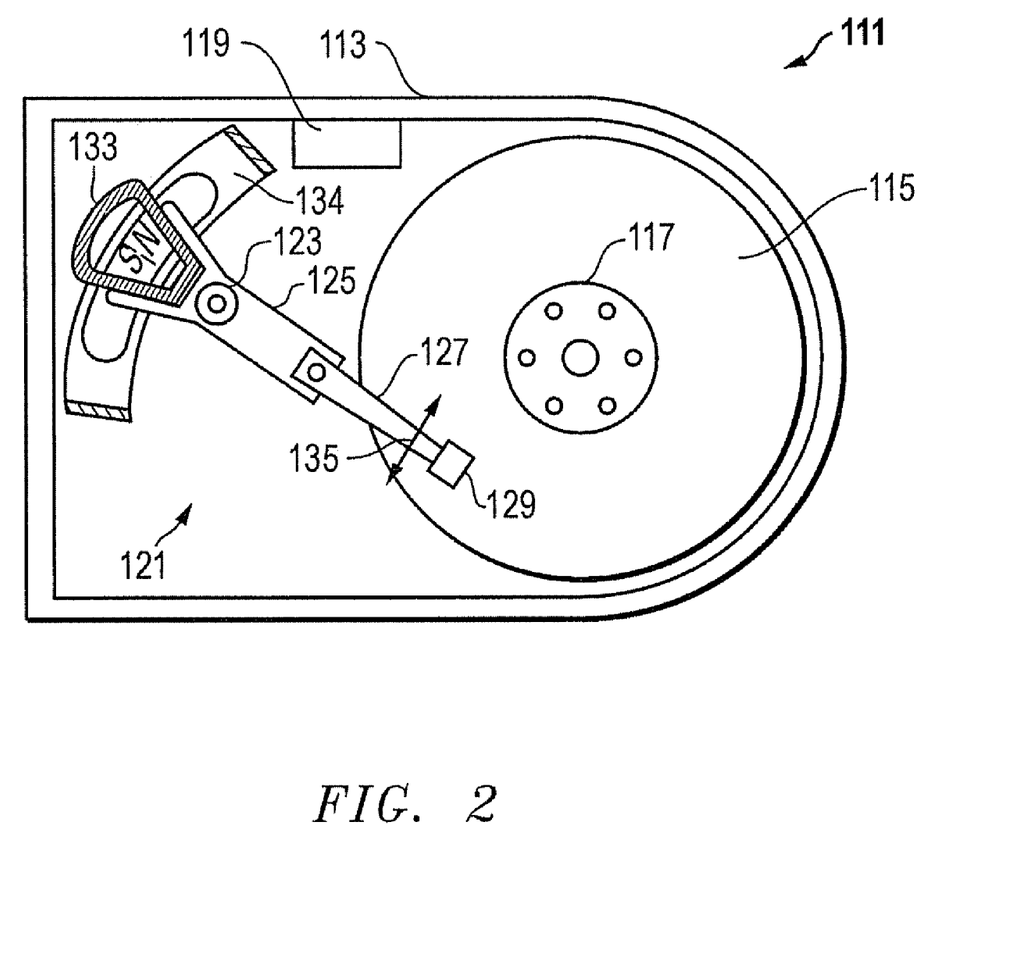
FIG. 2 is a schematic plan view of a disk drive constructed in accordance with the invention.

Referring to FIG. 2, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 also is mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head may be pre-loaded against the surface of disk 115 by suspension 127.

Suspensions 127 have a spring-like quality which biases or urges the air bearing surface of the slider 129 toward the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Referring now to FIGS. 3-8, embodiments of a system and apparatus for providing a streamlined contour and reduction in axial flow at the attachment interface between a suspension and flexure in a disk drive are shown. To help better define the invention, the pivot 123 has an axis 141 for pivotal movement of the actuator 121 relative to the enclosure 113 (FIG. 2). The arm 125 defines a longitudinal direction 143 that extends radially relative to the axis 141, and a lateral direction 145 that is transverse to the longitudinal direction 143.

Figure 3:
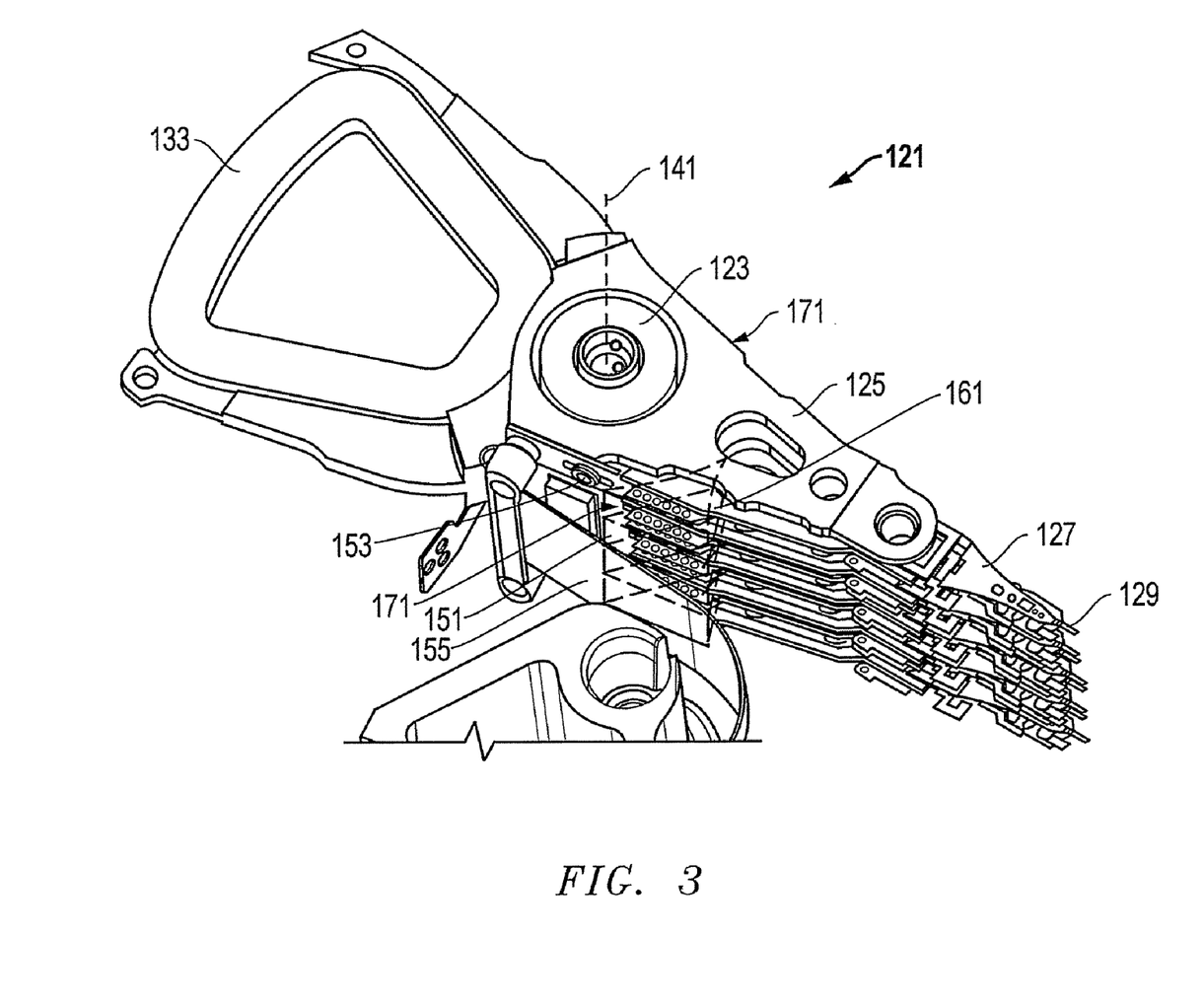
FIG. 3 is a partially sectioned top isometric view of one embodiment of an actuator assembly constructed in accordance with the invention.
Figure 6:
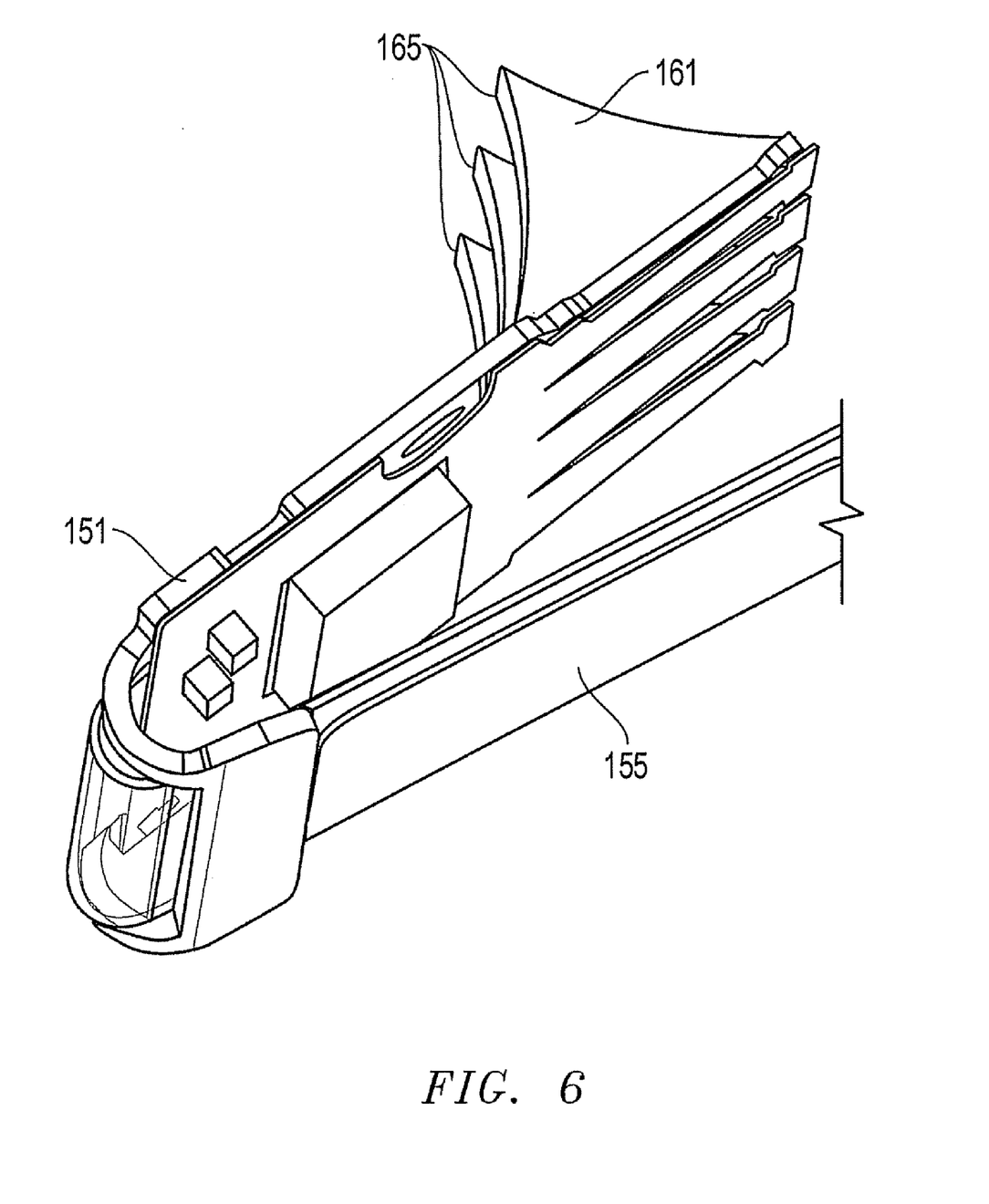
FIG. 6 is an enlarged isometric view of one embodiment of a flex cable portion for an actuator assembly and is constructed in accordance with the invention.
Figure 7:
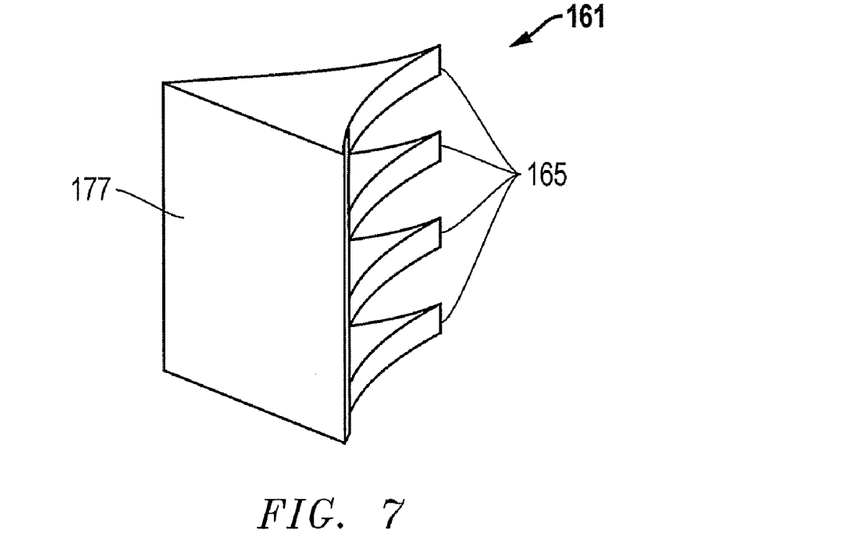
FIG. 7 is an enlarged isometric view of a block utilized by the flex cable portion of FIG. 6 and is constructed in accordance with the invention.
Figure 8:
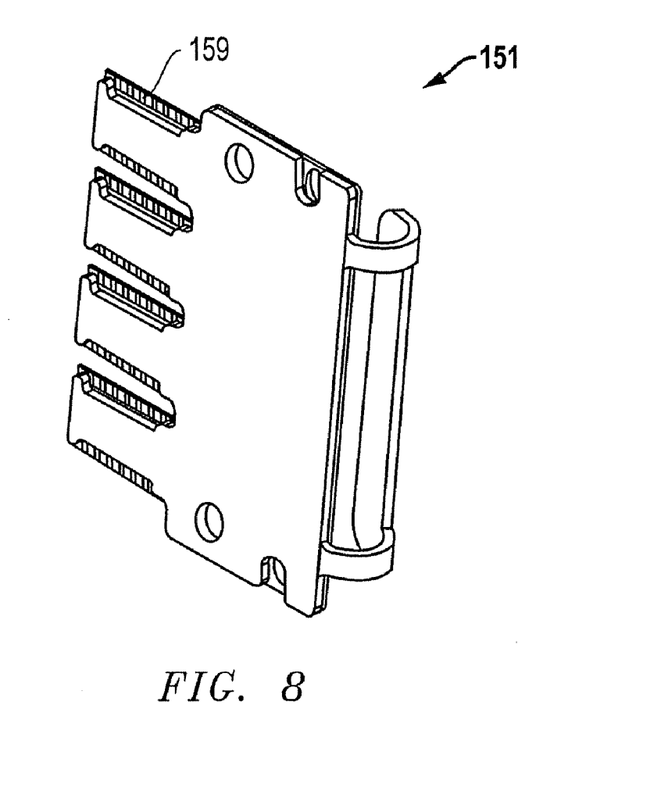
FIG. 8 is an isometric view of a flex stiffener for the flex cable portion of FIG. 7 and is constructed in accordance with the invention.

As best shown in FIGS. 6 and 8, a flex stiffener 151 is secured to the actuator assembly 121, such as with a fastener (e.g., screw) 153 (FIG. 3). A flexible cable 155 is secured to the stiffener 151 and is electrically coupled to a conductive flexure that extends from the transducer 129 to the arm 125. The flexure has a tail 157 that is interconnected with and secured to pads 159 (FIG. 8) on the stiffener 151 and likewise electrically coupled to conductors in the flexible cable 155.

Referring now to FIG. 3-7, a diverter 161 is located adjacent the actuator comb and the stiffener 151. The diverter 161 extends longitudinally and laterally across portions of the arm 125 for diverting airflow away from the stiffener 151. The diverter 161 is pivotally movable with the actuator assembly 121 relative to the enclosure 113 (FIG. 1) and the disks 115.

The diverter 161 may be configured in many different ways. For example, the diverter 161 may be integrally formed with a barrel 163 (FIG. 4) of the actuator comb such that the diverter 161 and the barrel 163 of the comb comprise the same aluminum material. In another embodiment, the diverter 161 is integrally formed with the stiffener 151 (FIGS. 3 and 6) such that the diverter 161 and the stiffener 151 comprise the same plastic material. In still another embodiment, the diverter 161 is a completely separate component from the actuator comb 163 and the stiffener 151, but is otherwise secured or located adjacent to one or both components.

In another example, when the disk drive comprises embodiments having two or more disks 115, the diverter 161 may be formed from a lightweight plastic material having a plurality of fins 165 (FIGS. 6 and 7) that are located between adjacent ones of the arms 125 of the actuator assembly 121. The fins 165 are axially spaced apart from each other by sufficient distance to accommodate the axial thicknesses of the arms themselves.

Figure 4:
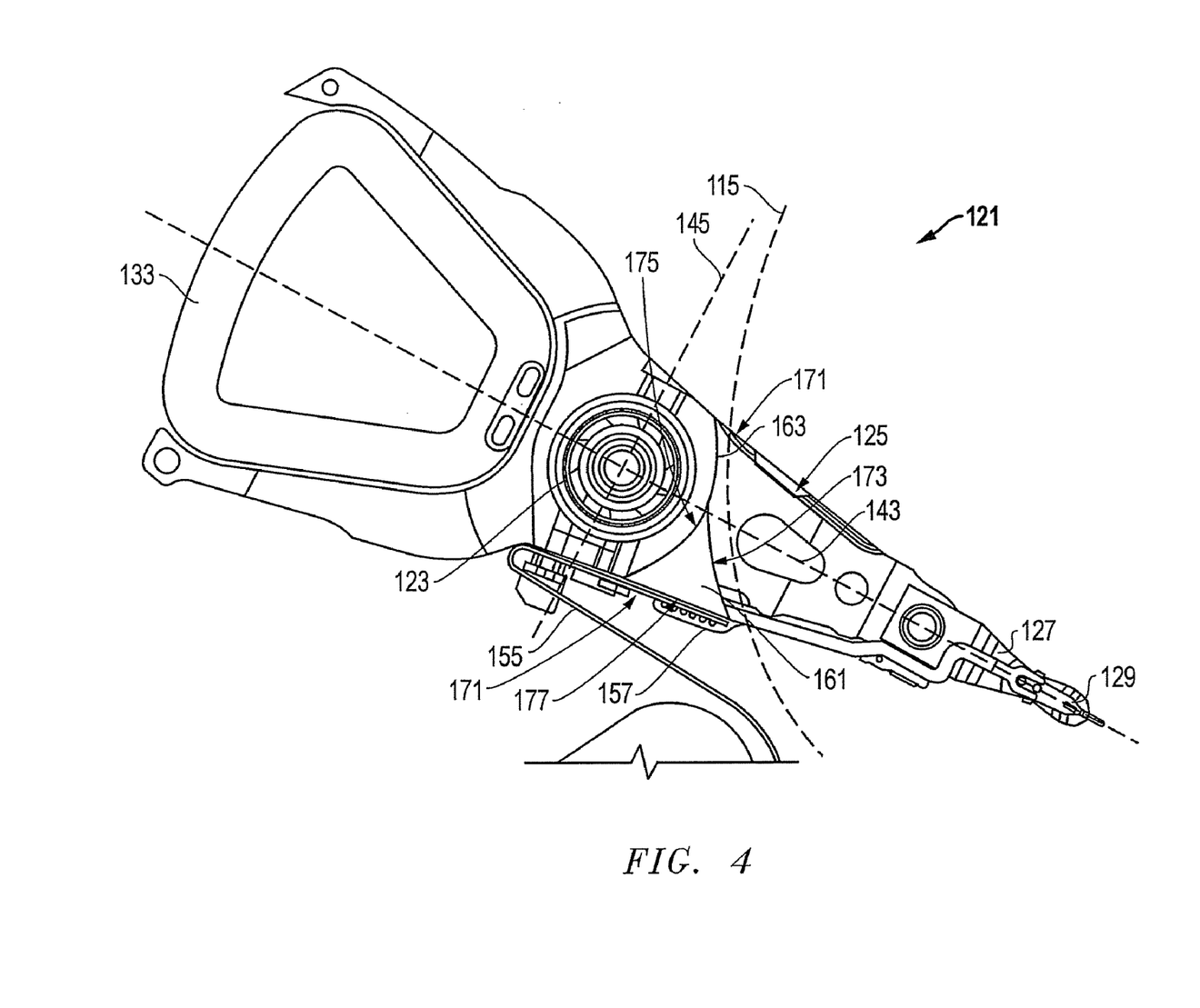
FIG. 4 is a partially sectioned top view of the actuator assembly of FIG. 3 and is constructed in accordance with the invention.
Figure 5:
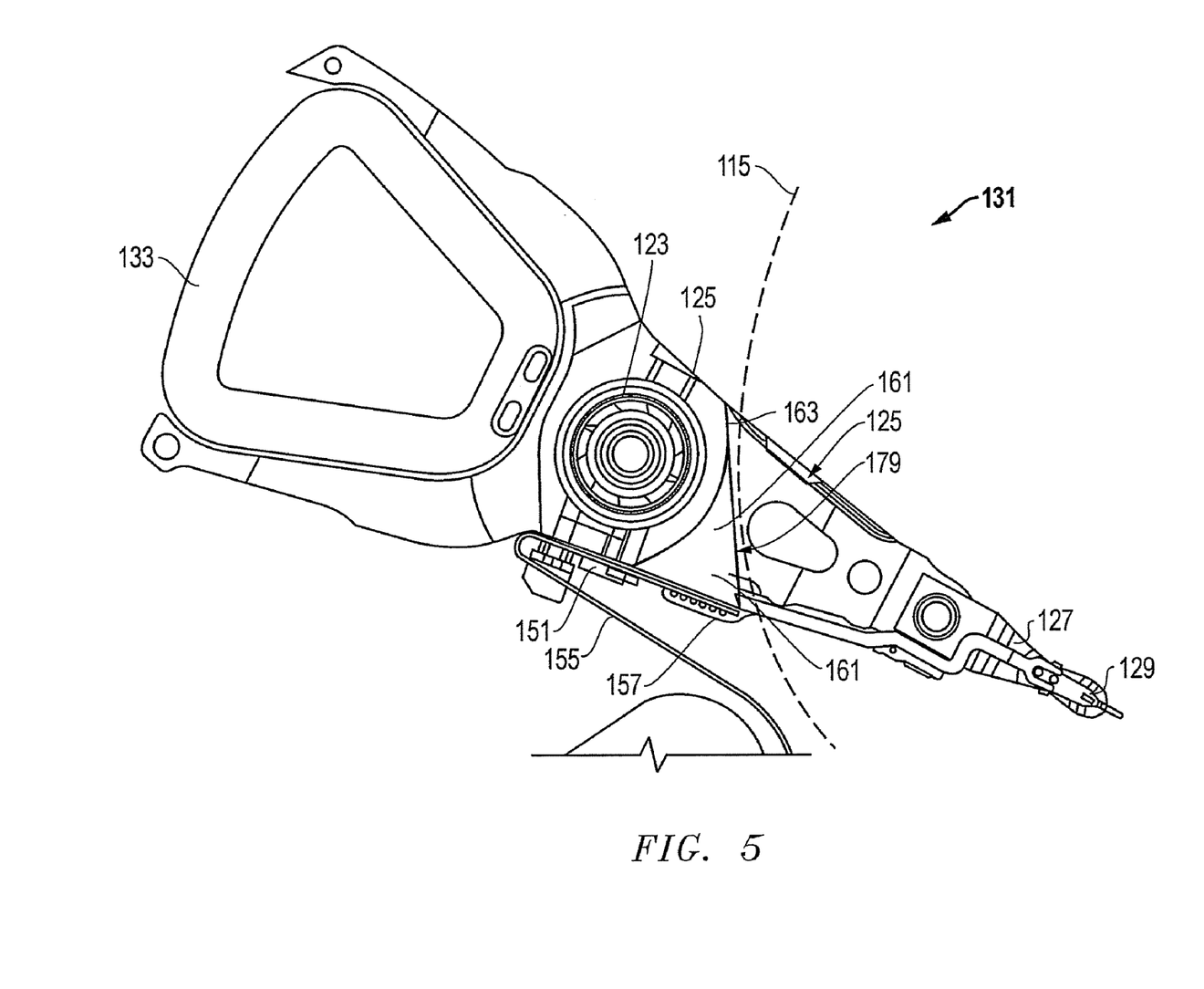
FIG. 5 is a partially sectioned top view of another embodiment of an actuator assembly constructed in accordance with the invention.

As best shown in FIGS. 3-5, the arm(s) 125 have lateral side edges 171 that define their lateral perimeters. In some embodiments, an entirety of the diverter 161 is located between the lateral side edges 171 such that the diverter 161 is located in an "interior" of the arms 125. In the embodiment shown, the diverter 161 has a triangular, block-like shape that forms a solid prism located between the stiffener 151 and the barrel 163 of the actuator comb. The diverter 161 may contact or simply extend adjacent to these components. However, in other embodiments (e.g., integral formation of the diverter 161 with the stiffener 151), a base portion of the fins 165 of the diverter 161 may extend beyond one of the lateral side edges of the actuator arms 125 to flange In some embodiments, the diverter may include a concave surface 173 (FIG. 4) that is generally contoured to a radius of the disk 115. In addition, the diverter 161 may include a second concave surface 175 that is contoured to the barrel 163 of the actuator comb, and a third surface 177 (FIGS. 4 and 7) that is flat and abuts the stiffener 155. In another embodiment, the diverter 161 includes a flat surface 179 (FIG. 5) that faces toward the disk 115 and extends tangentially from a surface of the barrel 163 of the actuator comb.

While the invention has been shown or described in only some of its forms, it should be apparent to those skilled in the art that it is not so limited, but is susceptible to various changes without departing from the scope of the invention.

What is claimed is:

1. A disk drive, comprising:
an enclosure;
a disk rotatably mounted to the enclosure and having a magnetic media;
an actuator assembly mounted to the enclosure and having a pivot with an axis for pivotal movement relative to the enclosure, a comb, a coil for a voice coil motor on one side of the comb, and an arm extending from the comb opposite the coil, the arm defining a longitudinal direction that extends radially relative to the axis, and a lateral direction that is transverse to the longitudinal direction;
a stiffener secured to the actuator assembly;
a flexible cable secured to the stiffener;
a suspension mounted to the arm and having a transducer for reading data from the disk;
a flexure extending from the transducer to the arm, the flexure having a tail that is secured to the stiffener and coupled to the flexible cable; and
a diverter located adjacent the comb and the stiffener, the diverter also extending longitudinally and laterally across portions of the arm for diverting airflow away from the stiffener, and the diverter being pivotally movable with the actuator assembly relative to the enclosure.

2. A disk drive according to claim 1, wherein the diverter is integrally formed with a barrel of the comb, and the diverter and the barrel of the comb comprise an aluminum material.

3. A disk drive according to claim 1, wherein the diverter is integrally formed with the stiffener, and the diverter and the stiffener comprise a plastic material.

4. A disk drive according to claim 1, wherein the diverter is a separate component from the comb and the stiffener, and the diverter comprises a plastic material.

5. A disk drive according to claim 1, wherein the arm has lateral side edges that define a lateral perimeter of the arm, and an entirety of the diverter is located between the lateral side edges.

6. A disk drive according to claim 1, wherein the diverter has a triangular, block-like shape that forms a solid prism located between and in contact with the stiffener and a barrel of the comb.

7. A disk drive according to claim 6, wherein the diverter includes a concave surface that is generally contoured to a radius of the disk.

8. A disk drive according to claim 7, wherein the diverter includes a second concave surface that is contoured to the barrel of the comb, and a third surface that is flat and abuts the stiffener.

9. A disk drive according to claim 6, wherein the diverter includes a flat surface that faces toward the disk and extends tangentially from a surface of the barrel of the comb.

10. A disk drive, comprising:
an enclosure;
a plurality of disks rotatably mounted to the enclosure and comprising magnetic media;
an actuator assembly mounted to the enclosure and having a pivot with an axis for pivotal movement relative to the enclosure, a comb, a coil for a voice coil motor on one side of the comb, and arms extending from the comb opposite the coil, the arms defining a longitudinal direction that extends radially relative to the axis, and a lateral direction that is transverse to the longitudinal direction;
a stiffener secured to the actuator assembly adjacent the arms;
a flexible cable secured to the stiffener;
a plurality of suspensions mounted to the arms and having transducers for reading data from the disks;
a plurality of flexures extending from the transducers to the arms, the flexures having tails that are secured to the stiffener and coupled to the flexible cable; and
a diverter located adjacent the comb and the stiffener, the diverter also extending longitudinally and laterally across portions of the arms for diverting airflow away from the stiffener, and the diverter being pivotally movable with the actuator assembly relative to the enclosure; and
the arms have lateral side edges that define lateral perimeters of the arms, and an entirety of the diverter is located between the stiffener and at least one of the lateral side edges.

11. A disk drive according to claim 10, wherein the diverter is integrally formed with a barrel of the comb, and the diverter and the barrel of the comb comprise an aluminum material.

12. A disk drive according to claim 10, wherein the diverter is integrally formed with the stiffener, and the diverter and the stiffener comprise a plastic material.

13. A disk drive according to claim 10, wherein the diverter is a separate component from the comb and the stiffener, and the diverter comprises a plastic material.

14. A disk drive according to claim 10, wherein the diverter has a triangular, block-like shape located between and in contact with the stiffener and a barrel of the comb, the diverter having a plurality of fins extending between adjacent ones of the arms.

15. A disk drive according to claim 14, wherein the diverter includes concave surfaces that are generally contoured to a radius of the disks, and the diverter includes another surface that is contoured to the barrel of the comb, and a base surface that is flat and abuts the stiffener.

16. A disk drive according to claim 14, wherein the diverter includes flat surfaces that face toward the disks and extends tangentially from a surface of the barrel of the comb.

17. A disk drive, comprising:
an enclosure;
a plurality of disks rotatably mounted to the enclosure and comprising magnetic media;
an actuator assembly mounted to the enclosure and having a pivot with an axis for pivotal movement relative to the enclosure, a comb, a coil for a voice coil motor on one side of the comb, and arms extending from the comb opposite the coil, the arms defining a longitudinal direction that extends radially relative to the axis, and a lateral direction that is transverse to the longitudinal direction;
a stiffener secured to the actuator assembly adjacent the arms;
a flexible cable secured to the stiffener;
a plurality of suspensions mounted to the arms and having transducers for reading data from the disks;
a plurality of flexures extending from the transducers to the arms, the flexures having tails that are secured to the stiffener and coupled to the flexible cable; and
a diverter located adjacent the comb and the stiffener, the diverter having a plurality of fins that extend between adjacent ones of the arms both longitudinally and laterally for diverting airflow away from the stiffener, and the diverter being pivotally movable with the actuator assembly relative to the enclosure;
the arms have lateral side edges that define lateral perimeters of the arms, and an entirety of the diverter is located between the stiffener and at least one of the lateral side edges.

18. A disk drive according to claim 17, wherein the diverter is integrally formed with a barrel of the comb, and the diverter and the barrel of the comb comprise an aluminum material.

19. A disk drive according to claim 17, wherein the diverter is integrally formed with the stiffener, the diverter and the stiffener comprise a plastic material, and the diverter includes flat surfaces that face toward the disks and extends tangentially from a surface of the barrel of the comb.

20. A disk drive according to claim 17, wherein the diverter is a separate component from the comb and the stiffener, and the diverter comprises a plastic material, and the diverter includes concave surfaces that are generally contoured to a radius of the disks, and the diverter includes another surface that is contoured to the barrel of the comb, and a base surface that is flat and abuts the stiffener.

* * * * *